United States Patent [19]

Boyd et al.

[11] Patent Number: 4,829,505

[45] Date of Patent: May 9, 1989

[54] MULTIPLE LAYER OPTICAL MEMORY SYSTEM USING SECOND-HARMONIC-GENERATION READOUT

[75] Inventors: Gary T. Boyd, Woodbury, Minn.; Yuen-Ron Shen, Berkeley, Calif.

[73] Assignee: The Regents of the University of California, Berkeley, Calif.

[21] Appl. No.: 7,460

[22] Filed: Jan. 28, 1987

[51] Int. Cl.$^4$ .................... G11B 7/08; G11B 7/24
[52] U.S. Cl. ..................... 369/94; 369/106; 369/120; 358/342
[58] Field of Search ..................... 369/44–46, 369/93, 94, 100, 101, 106, 111, 112, 116, 120, 124; 358/342; 350/353, 354, 162.2; 307/425, 427; 365/117, 121; 427/164, 165; 428/411.1, 441

[56] References Cited

U.S. PATENT DOCUMENTS

| | | | |
|---|---|---|---|
| 3,982,135 | 9/1976 | van der Ziel | 307/427 |
| 4,090,031 | 5/1978 | Russell | 369/94 X |
| 4,199,698 | 4/1980 | Bethea et al. | 307/427 X |
| 4,240,048 | 12/1980 | Zumsteg | 307/427 X |
| 4,536,450 | 8/1985 | Garito | 428/411.1 |
| 4,659,177 | 4/1987 | Choe et al. | 428/441 X |
| 4,711,532 | 12/1987 | Choe | 350/354 |
| 4,713,518 | 12/1987 | Yamazaki et al. | 427/164 X |
| 4,720,355 | 1/1988 | DeMartino | 350/353 X |
| 4,728,576 | 3/1988 | Gillberg-LaForce et al. | 428/411.1 |
| 4,731,754 | 3/1988 | Ogden et al. | 365/121 |
| 4,732,783 | 3/1988 | Choe et al. | 427/165 X |
| 4,733,109 | 3/1988 | Palazzotto | 307/427 |

Primary Examiner—Alan Faber
Assistant Examiner—W. R. Young
Attorney, Agent, or Firm—Clarence R. Pfeiffer; Robert J. Henry; Robert W. Mulcahy

[57] ABSTRACT

A novel optical read and write information storage system is described which comprises a radiation source such as a laser for writing and illumination, the radiation source being capable of radiating a preselected first frequency; a storage medium including at least one layer of material for receiving radiation from the radiation source and capable of being surface modified in response to said radiation source when operated in a writing mode and capable of generating a pattern of radiation of the second harmonic of the preselected frequency when illuminated by the radiation source at the preselected frequency corresponding to the surface modifications on the storage medium; and a detector to receive the pattern of second harmonic frequency generated.

26 Claims, 1 Drawing Sheet

MULTIPLE LAYER OPTICAL MEMORY SYSTEM USING SECOND-HARMONIC-GENERATION READOUT

The invention described herein arose in the course of, or under, Contract No. DE-AC03-76SF00098 between the U.S. Department of Energy and the University of California.

BACKGROUND OF THE INVENTION

1. Field of the Invention

This invention relates to an optical mass storage system. More particularly, this invention relates to a multi-layered optical read and write mass storage system which uses generated second harmonic frequencies to readout information stored in one of a number of layers of stored information.

2. Description of the Related Art

With the rapid evolution of information processing in the computer field has come a concurrent need to store massive amounts of information in readily accessible media. Magnetic disk storage has provided much more rapid access to large amounts of stored information than previously used magnetic tape means, particularly when magnetic disk packs of as many as 12 stacked magnetic disks are used. But this storage media has, itself, been eclipsed by the development of CD ROMs which can store vast amounts of information in a much more compact form compared to such prior storage means as the magnetic disk packs. However, the CD ROM technology in use today involves read only memory without erasing and rewriting capabilities.

Thus the seemingly insatiable appetite of the information processing industry for compact mass storage of information in a mode which is not only easily accessible but also capable of modification still presents an incompletely met challenge to the information storage industry.

What is needed is an information storage media which is randomly accessible, compact like the CD ROM technology, and yet capable of storing vast amounts of information in an alterable mode, i.e., with erasing and rewriting capabilities of the rather massive magnetic disk pack storage devices.

SUMMARY OF THE INVENTION

A new means has been discovered for storing large amounts of information in a compact, randomly accessible, and, preferably, erasable mode wherein information can be stored in an optical storage media and read by the detection of a second harmonic frequency generated by selective illumination of the storage media.

It is, therefore, an object of this invention to provide a compact, random access, optical mass storage system having the capability to read and write information.

It is another object of this invention to provide a compact, random access, optical mass storage system having the capability to write information thereto and to read the stored information by the detection of a second harmonic frequency selectively generated by illumination of a surface altered layer of storage media.

It is a further object of this invention to provide a compact, random access, optical mass storage system having the capability to write information thereto and to read the stored information by the detection of a second harmonic frequency selectively generated by illumination of a surface altered layer of storage media and having a plurality of such surface altered storage layers arranged in a stack with transparent spacer means between the storage surfaces.

It is yet a further object of this invention to provide a compact, random access, optical mass storage system having the capability to write information thereto and to read the stored information by the detection of a second harmonic frequency selectively generated by illumination of one or more surface altered layers of storage media wherein the stored information may be erased and new information stored on the erased media.

These and other objects of this invention will be apparent from the following description and accompanying drawings.

In accordance with the invention, an optical read and write information storage system is provided comprising: radiation means for writing and illumination, the radiation means being capable of radiating a preselected first frequency; storage means including a layer of material for receiving radiation from the radiation means and capable of being surface modified in response to said radiation means when operated in a writing mode and capable of generating a second harmonic of said preselected frequency when illuminated by the radiation means at the preselected frequency; and detection means to receive the second harmonic frequency generated.

DETAILED DESCRIPTION OF THE INVENTION

Figure 1:
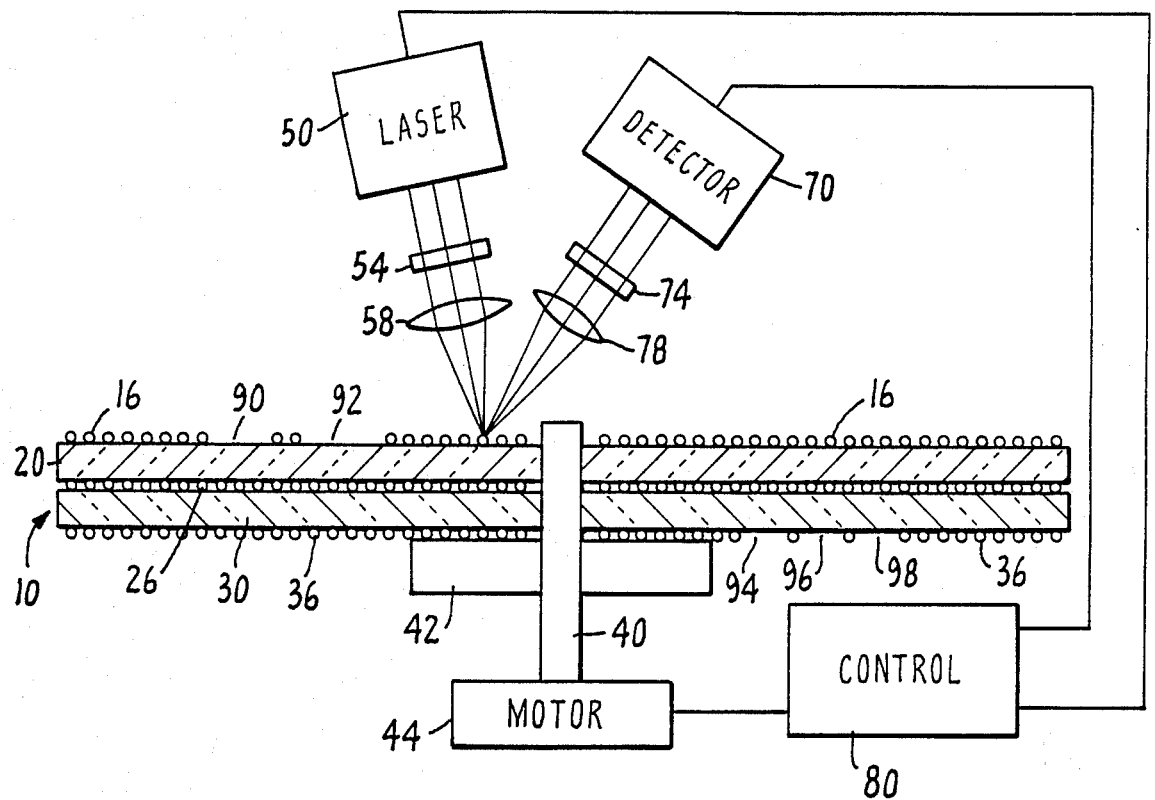
FIG. 1 is a vertical cross-sectional view illustrating one embodiment of the invention.

Referring now to FIG. 1, an optical storage means is generally indicated at 10 which may generally comprise a circular disk, comprising, as shown in the illustrated embodiment, a first surface storage means 16, a first support means 20, a second surface storage means 26, a second support means 30, and a third surface storage means 36.

Mounted above optical storage means 10 is a radiation source means 50 having a filter means 54 to exclude second harmonic radiation emitted by radiation source means 50 from reaching storage means 10 and focus lens means 58 to permit focusing of the radiation from radiation source means 50 on a portion of storage means 10 of predetermined lateral size and depth.

Also mounted above optical storage means 10 is a detection means 70, having a filter means 74 to filter out all incoming radiation of wavelength other than the predetermined second harmonic frequency, and collection lens means 78 to focus the second harmonic frequency radiation from the illuminated portion of storage medium 10 to detection means 70.

To permit radiation source means 50 and detection means 70 to focus on various areas of optical storage means 10 without physical movement of either radiation source means 50 or detection means 70, means may be provided to rotate storage means 10 comprising a shaft or hub 40 which is received in a corresponding opening in storage means 10 and a shoulder or platform 42 connected to shaft 40 upon which optical storage means 10 may be supported as it is rotated by a motor means 44 coupled to shaft 40.

Control of motor means 40 as well as radiation source means 50 and detection means 70 may be under the direction of a central processor means 80 which may also dispense information to be written to optical storage means 10 via radiation source means 50 as well as receive and process information read from storage means 10 via detection means 70.

One of the features of the invention comprises the utilization of second harmonic generation (SHG) to detect the presence or absence of an altered state in the surface of storage surface means 16 as well as underlying surface storage means such as illustrated means 26 and 36.

Optical second harmonic generation (SHG) is a process in which exposure to a source of monochromatic radiation, e.g., light at a frequency $\omega$ and at a sufficient intensity, results in the generation of radiation at the second harmonic frequency of $2\omega$. The process is forbidden in centrosymmetric media, i.e., does not occur in the bulk portion of a centrosymmetric material, but occurs only at surfaces and interfaces of centrosymmetric materials. The intensity of the second harmonic radiation is proportional to the square of the intensity of the source radiation. Hence, the second harmonic radiation originates predominantly from the surface within the focal spot of the radiation source.

Thus by focusing an illuminating beam of monochromatic radiation to a predetermined depth, the presence or absence, at that depth, of molecules of a particular material capable (if present) of absorbing the monochromatic radiation and providing SHG can be detected.

Surface storage means 16, therefore, comprises a material capable of generating second harmonic radiation in response to illumination by a monochromatic radiation source in a detectable pattern indicative of the state of the surface, i.e., whether or not surface storage means 16, at the particular point being read by illumination and detection, has been altered. In a preferred embodiment, surface storage means 16 will normally comprise a material having a thickness of not more than 1-5 molecules and preferably by a monomolecular layer of an alterable material which is carried on a surface of a support material such as support means 20 which is generally transparent to either the illuminating radiation wavelengths or the second harmonic radiation generated to thereby permit the use of multiple storage layers as will be discussed below.

In its simplest form, the alteration of surface storage means 16 may be carried out by using the same illumination source, e.g., a laser beam, at a much higher power level to alter the surface of the surface storage means at that point. Intensity is herein defined as energy per unit time per unit area or power per unit area. For example, in one embodiment this may comprise ablating away most, if not all, of the thin layer of molecules at a particular point in a writing operation.

This is illustrated in FIG. 1 at 90 and 92 in surface storage means 16 and at 94, 96, and 98 in surface storage means 36 wherein, in an exaggeration for illustrative purposes only, the molecules are shown as completely removed. It will be understood, however, that in many instances, not all of the molecules will be removed in creating the altered surface, nor is such complete removal necessary. It is only necessary to remove, or redistribute, a sufficient number of molecules to provide a detectable difference in the second harmonic generation (SHG) indicative of an altered state.

It will be readily apparent, then why, in the preferred embodiment, a very thin, if not monomolecular layer is preferable for surface storage means 16. Removal of surface molecules from a thick layer of material will only expose the next layer of molecules of the same material which may not materially alter the amount of SHG detected.

In a preferred embodiment, surface storage means 16 should also possess the additional attribute of being restorable to an unaltered state. In other words, if a sufficient number of molecules at a particular point have been removed to provide a detectable difference in the amount of second harmonic radiation, the system should be capable of being able to restore sufficient molecules to change the SHG back to a level substantially equivalent to that prior to the alteration to thus provide an erasure mode for the storage medium. This, for example, could be carried out by a localized heating of the material to cause molecules to flow into the deficiency area or could comprise the use of an electric field placed across the material to cause migration of molecules into previously created voids or by combinations of such methods. With respect to the localized heating, this could be accomplished using a laser as a source of heat with a slightly larger focus to provide flow of molecules from the area immediately surrounding the deficiency into the void or hole area to restore the surface.

Materials which may be used, in the preferred embodiment, for surface storage means 16, as well as for formation of lower layers of such materials arranged in a stack with intermediate support layers, such as the illustrated surface storage means 26 and 36, include any materials organic or inorganic which have at least the following characteristics:

(a) the material must be capable of being formed as a very thin layer of not more than about 1-5 molecules thick;

(b) the material must be capable of providing second harmonic generation (SHG), an other than linear response at a second harmonic, at the surface when exposed to radiation at a preselected frequency, and (c) the material must be capable of being altered at least on the surface to provide a detectable difference in SHG.

Preferably, the material comprising the storage means will also possess the ability to have the altered surface restored to its unaltered state, i.e., the ability to be erased and recorded over.

Examples of materials which may be altered, for example, to remove at least a significant portion of the molecules at any given point, e.g., to burn away the molecules by ablation with a laser beam, include organic dyes, particularly dyes in monomolecular layers such as, for example, a merocyanine dye or a Rhodamine dye such as Rhodamine 6G having the general formula, $C_{28}H_{31}ClN_2O_3$.

Other materials which might be used as alterable storage materials could include inorganic materials such as epitaxially grown crystals e.g., grown by Langmuir-Blodgett technique. Organic materials such as polymeric materials could be utilized as well. In general, any physically modifiable material may be utilized that has, when illuminated by a first frequency, a corresponding second harmonic nonlinear response. For example, the rodamine dye was initially nonlinear. Upon modification the dye changed to a decreased or reduced nonlinear state. The changes in either direction from the initial state carry the information, which is first stored and then later capable of being retrieved. While, as discussed above, the material may be altered by removal of the material—which will result, at least in some cases, in a read only memory—the surface might also be sufficiently altered by a photochemical or photochromic change such as by isomerism or bond breaking under stimulation from the radiation source to result in a detectable difference in the SHG and thus, render the material suitable for use as an optical storage material in the practice of this invention.

In accordance with the invention, surface storage means 16, as well as subsequent layers of such storage surface means such as the illustrated surface storage means 26 and 36, are carried on support or spacer means, such as the illustrated support means 20 and 30, which comprise materials which are transparent to the radiation frequency used to read and write to the surface storage means and also transparent to the SHG frequency as well. In this manner, surface storage means at lower levels may be written to or read from without interference, e.g., without absorption of radiation energy, by the intervening support layers. Typical of materials which could be used for construction of support means 20 and 30 are transparent glasses including fused silica. In some instances, organic polymers may also be employed if they exhibit sufficient transparency to the radiation and SHG frequencies employed in the reading and writing operations of the system.

The number of storage layers which may be stacked together, presumably with intervening spacer layers, to increase the memory density is limited by (a) the accumulated absorption of the incident light by the storage layers, which can be kept at a minimum by choosing a material not resonant with the illumination frequency, and (b) the focusing lens focal length (f) divided by its confocal parameter ($Z_{01}$). Since each spacer should be one or two confocal parameters thick, $f/Z_{01}$ could equal as high as 100. Thus, as many as 100 spacers and, therefore, 100 storage layers could be used.

Radiation source means 50 which provides the source of monochromatic radiation focused on a particular point on the surface storage means resulting in SHG, preferably comprises a continuous wave (cw) laser light source generating monochromatic light in a wavelength range used by any of the commonly available laser sources. The minimum intensity of the laser must be sufficient to result in SHG of at least $10^9$ photons per second when focused on an area of 1 square micrometer. The maximum intensity level of the laser during the reading mode must be less than the power at which damage to the surface storage means will occur.

Although it is within the contemplation of this invention that separate sources of radiation may be utilized to respectively provide sufficient illumination in the reading mode to provide a detectable amount of SHG and a greater amount of radiation directed against the surface storage means to alter the surface in the write mode; in the preferred embodiment, the same monochromatic laser source is used for both reading and writing modes.

Detection means 70 may comprise a single photodetector sensitive to radiation in the range of the SHG frequency which will, of course, depend upon the frequency of the radiation source. In such a case the collector lens will be focused to a single spot corresponding to the spot to be illuminated by the radiation source during the read mode. Alternatively, however, detection means 70 may comprise a diode array capable of detecting light from several adjacent spots on the surface storage means in which case the collector lens will be focused accordingly.

When detection means 70 comprises a single photodetector, it is within the contemplation of the invention that the same lens system may be used for both radiation source 50 and detector means 70 although, of course, separate filter means would probably be used for each device. The same lens system could also be shared when detection means 70 comprises a diode array detector, but in such instance, the radiation means should be capable of illuminating more than one point to eliminate the need for separate lateral movement of radiation source 50 relative to detection means 70. This, in turn, however, might prevent utilization of the same radiation source for both writing and reading modes.

Rotation of storage means 10 permits a stationary radiation source and a stationary detection means to focus on a series of spots in a circle or track similar to magnetic disk technology. Thus, it is contemplated that storage means 10 may be rotated by motor means 44 to rotate storage means 10 at speeds which may be similar to those employed in spinning magnetic disk technologies. However, unlike the magnetic disk technology, such a stationary radiation source and stationary detection means could, by change of focus, read and write a number of tracks located in lower layers of surface storage means located in layers below the top layer of surface storage means. Thus, as illustrated in FIG. 1, without any movement by either radiation source 50 or detection means 70, tracks in surface storage means 16, 26, and 36 may all be either written to or read from simply by changing the focus of the lens system or systems depending upon whether the same lens system is used for both illumination and detection.

As in the magnetic disk type systems, a series of radiation sources and detection means could be circularly mounted above rotating storage means 10 to provide access to more than one track of each layer of surface storage means with each pair of radiation source and detector means adapted for limited lateral movement to permit each pair to read and write to a number of adjacent tracks using mechanisms similarly employed in magnetic disk technologies.

Furthermore, however, quite unlike the magnetic disk systems, a radiation source and detection means may be set up in a prefocused mode to focus only on a certain level while adjoining radiation sources and detection means would be prefocused on other levels of surface storage means comprising a part of optical storage means 10. This type of operation also contemplates that such radiation sources and detection means might be arranged for limited vertical adjustment, for example, using well known mechanical or electromechanical mechanisms such as a motorized worm gear mechanism to adjust the focus thereby permitting the reading and writing of a number of adjacent layers, but not necessarily all layers with other radiation sources and detection means vertically adjustable to read and write yet other layers. Finally, limited vertical and lateral adjustment by the same radiation source and detection means is also contemplated.

To further illustrate the invention, a clean fused silica support plate was spin coated with an approximately monomolecular layer of Rhodamine 6G dye. Absorption measurements confirmed that an average of one dye monolayer was absorbed onto the surface of the fused silica support. A hole was then ablated or "written" in the dye layer by focusing 0.6 microjoules, 7.5 kHz, 532 nm laser pulses on the surface for 10 seconds. To probe or "read" the hole, a cw mode-locked Nd:YAG laser with a pulse width of 80 pico-seconds, a pulse repetition time of 10 nanoseconds, and an energy of 2 nanojoules was used with the beam focused to an 8 micron spot. The hole was scanned in 0.5 micron steps and the resulting generated second harmonic frequency for one side of the hole was detected and plotted as shown in FIG. 2.

Figure 2:
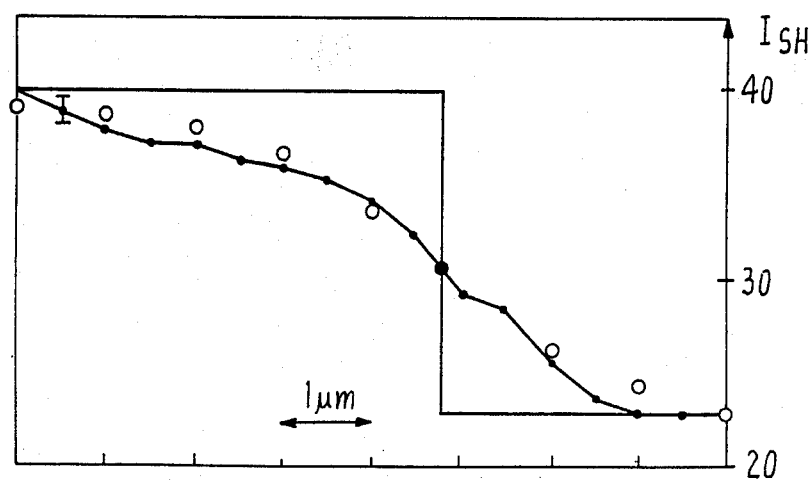
FIG. 2 is a plot showing a profile of secondary harmonic radiation generated at one edge of an altered portion of the storage medium.

The white dots along the curve in FIG. 2 indicate the theoretical plot and the black dots indicate the actual data points showing the detectable difference in signal of the second harmonic radiation generated indicative of the number density of molecules of the surface storage material present in the hole or void area. It will be seen that the experimental evidence is in good agreement with the theoretical points.

Thus, the invention provides a novel three dimensional optical storage system utilizing second harmonic generation from monochromatically illuminated storage surfaces to indicate the state of the memory site. The novel system provides means for writing to the memory surface by altering the surface with a high intensity radiation source which may comprise the same source used to illuminate the memory surface at a lower energy level to permit reading of the surface by detection of second harmonic generation indicative of the state of the surface. The storage surfaces may be stacked in a number of layers with intervening support layers transparent to the frequency of radiation used for illumination and the second harmonic radiation generated. The novel system also envisions, in a preferred embodiment, the erasure and restoration of the altered memory surface.

While a specific embodiment of the improved optical information storage system has been illustrated and described in accordance with this invention, modifications and changes of the apparatus, parameters, materials, etc. will become apparent to those skilled in the art, and it is intended to cover in the appended claims all such modifications and changes which come within the scope of the invention.

Having thus described the invention, what is claimed is:

1. An optical read and write information storage system capable of storing information on more than one layer comprising:
   (a) radiation means for writing information on and illumination of an information storage means, said radiation means emitting light of a preselected first frequency;
   (b) information storage means comprising a plurality of surface storage means for receiving radiation from said radiation means and capable of being surface modified in response to said radiation means when operated in a writing mode and capable of generating light containing a second harmonic frequency of said preselected first frequency when illuminated by the radiation means at the preselected first frequency; and
   (c) means receiving light generated by said surface storage means when illuminated by said radiation source for detecting second harmonic frequency light within said received light and for generating an information signal from said detected second harmonic frequency light.

2. The optical information storage system of claim 1 wherein each of said surface storage means comprise a 1 to 5 molecule thick layer of material capable of generating secondary harmonic radiation when exposed to said radiation source.

3. The optical information storage system of claim 2 wherein each of said surface storage means substantially comprises a monomolecular layer of said material.

4. The optical information storage system of claim 2 wherein each of said 1 to 5 molecule thick layers comprising said surface storage means is separated from an adjacent layer of surface storage means by a spacer comprising a material transparent to said light of said preselected first frequency emitted by said radiation source and also transparent to said light containing said second harmonic frequency generated by said surface storage means.

5. The optical information storage system of claim 4 wherein said spacer comprises a layer of transparent glass.

6. The optical information storage system of claim 4 wherein said information storage means comprise from 2 to 100 of said 1 to 5 molecule thick surface storage means, each separated from adjacent surface storage means by one of said transparent spacers.

7. The optical information storage system of claim 1 wherein each of said surface storage means comprise a layer of dye molecules which exhibit nonlinear second harmonic generation.

8. The optical information storage system of claim 7 wherein said dye molecules have the general formula $C_{28}H_{31}ClN_2O_3$.

9. The optical information storage system of claim 1 wherein said radiation source comprises laser means.

10. The optical information storage system of claim 9 wherein said laser means comprise a monochromatic light source operable at a first intensity level sufficient to stimulate second harmonic frequency generation by said surface storage means but insufficient to alter said surface storage means.

11. The optical information storage system of claim 10 wherein said monochromatic laser light source is operable at a second higher intensity level capable of sufficiently altering said surface storage means to result in a detectable difference in the amount of second harmonic radiation generated by said surface storage means after said altering of said surface.

12. The optical information storage system of claim 11 wherein said monochromatic laser light source further includes filter means to filter out any radiation other than light containing said preselected first frequency.

13. The optical information storage system of claim 11 wherein said monochromatic laser light source further includes adjustable focus means to permit light from said monochromatic laser light source to alternatively focus on different surface storage means at different levels.

14. The optical information storage system of claim 11 wherein said monochromatic laser light source is operable at a first preselected frequency having a wavelength differing from the absorption maximum of the storage material.

15. The optical information storage system of claim 11 wherein said laser light source is operable in a mode to change said altered surface back to a condition sufficiently similar to the condition of said surface storage means prior to said altering to result in second harmonic radiation generation substantially at the same level as from an unaltered surface.

16. The optical information storage system of claim 15 wherein said laser light source is operable in a heating mode to impart sufficient heat to said surface storage means to change said altered surface back to said condition similar to an unaltered surface.

17. The optical information storage system of claim 16 wherein said laser light source is operable in a heating mode having a slightly larger area of focus on said surface storage means to impart sufficient heat to the altered portion of said surface storage means as well as the area immediately surrounding said altered portion to change said altered surface back to said condition similar to an unaltered surface.

18. The optical information storage system of claim 11 wherein said detection means further includes filter means to filter out radiation other than light containing said second harmonic frequency generated by said surface storage means.

19. The optical information storage system of claim 11 wherein said detection means further includes adjustable focus means to collect light containing said second harmonic frequency emitted by a particular portion of said surface storage means, said focus means permitting collection of light containing said second harmonic radiation from different layers of said surface storage means in said system.

20. The optical information storage system of claim 19 wherein common focus means are used to permit said laser light source and said detection means to respectively illuminate and receive light focused on a particular area and at a particular depth in said information storage means corresponding to one of said layers of surface storage means.

21. The optical information storage system of claim 1 wherein rotational means are provided to rotate said information storage means to permit said radiation source and said detection means to respectively illuminate and receive light focused on different areas of each layer of surface storage means corresponding to a first circular band.

22. The optical information storage system of claim 21 wherein lateral movement means are provided to move said radiation source and said detection means in a lateral direction generally perpendicular to said circle or band to permit said radiation source and said detection means to respectively illuminate and receive light focused on different areas of each layer of surface storage means corresponding to circular bands coaxial to said first circular band.

23. The optical information storage system of claim 22 wherein a plurality of said radiation sources and said detection means are provided in pairs each having lateral movement means to provide movement in a lateral direction generally perpendicular to said first circular band to permit each of said radiation source and detection means pairs to respectively illuminate and receive light focused on different areas of each layer of surface storage means corresponding respectively to some of the circular bands coaxial to said first circular band to thereby provide faster access to any particular circular band.

24. The optical information storage system of claim 23 wherein a plurality of said radiation sources and said detection means are provided in pairs each having adjustable focus means to permit each of said radiation source and detection means pairs to respectively illuminate and receive light focused on different areas on different layers of said surface storage means to thereby provide faster access to any particular layer of surface storage means.

25. An optical read and write information storage system comprising a plurality of storage layers capable of storing information therein comprising:
  (a) laser means for writing information on and illuminating said storage layers with monochromatic light at a preselected first frequency;
  (b) a plurality of storage layers each of which includes a surface of material thereon which is:
    capable of absorbing radiation from said laser means at said preselected first frequency when illuminated by said laser means at a first lower power level;
    capable of generating light containing a second harmonic frequency of said preselected first frequency when illuminated by said laser means at said first lower power level; and
    capable of being modified to selectively remove portions of said surface in response to said laser means when operated at a second, higher power level;
  (c) means for focusing light from said laser means to a depth corresponding to the surface of one of said storage layers in said plurality of storage layers; and
  (d) means receiving light generated by said surface of one of said storage layers when illuminated by light from said laser means at said first lower power level for detecting second harmonic frequency light within said received light and for generating an information signal from said detected second harmonic frequency light.

26. An optical read and write information storage system comprising a plurality of storage layers capable of storing information therein comprising:
  (a) a continuous wave laser light source for writing information on and illuminating the surface of one of said storage layers with monochromatic light at a preselected first frequency;
  (b) a plurality of information storage layers each of which includes a transparent support and an information storage surface thereon further characterized by:
    a 1 to 5 molecular layer thickness;
    generation of light containing second harmonic frequency of said preselected first frequency when illuminated by light from said laser means at a first lower power level; and
    responsive to light intensity received from said laser light source at a second higher energy level to selectively rearrange said molecules comprising said surface to provide an altered surface having a different level of second harmonic generation in response to illumination by said laser light source after rearrangement of said surface molecules;
  (c) means for adjustably focusing light from said laser means to a depth corresponding to the surface of one of said storage layers in said plurality of storage layers; and
  (d) detection means to receive light containing said second harmonic frequency generated by said surface of one of said storage layers when said surface is illuminated by light from said laser light source at said first lower power level, said detection means for distinguishing levels of second harmonic generation from portions of said surface having some of said molecules removed from levels of second harmonic generation from other portions of said storage surface not so altered and for generating an information signal from said distinguished levels.

* * * * *